United States Patent
Isaksson et al.

[11] Patent Number: 5,536,285
[45] Date of Patent: Jul. 16, 1996

[54] CERAMIC FILTERING OF GASES

[75] Inventors: Juhani Isaksson; Timo Eriksson; Pekka Lehtonen, all of Karhula, Finland

[73] Assignee: Foster Wheeler Energia Oy, Karhula, Finland

[21] Appl. No.: 246,221

[22] Filed: May 18, 1994

Related U.S. Application Data

[63] Continuation-in-part of Ser. No. 89,814, Jul. 12, 1993, Pat. No. 5,458,665.

[51] Int. Cl.$^6$ ................................................ B01D 29/66
[52] U.S. Cl. ................................ 55/302; 55/324; 55/523
[58] Field of Search ........................ 55/302, 462, 523, 55/324; 60/296, 311; 95/268, 280, 286

[56] References Cited

U.S. PATENT DOCUMENTS

| | | | |
|---|---|---|---|
| 3,606,737 | 9/1971 | Lefevre | 55/462 |
| 3,798,882 | 3/1974 | Kalen | 55/302 |
| 3,951,627 | 4/1976 | Barr, Jr. et al. | |
| 4,343,631 | 8/1982 | Ciliberti | 55/302 |
| 4,737,176 | 4/1988 | Lippert et al. | 55/523 |
| 4,830,749 | 5/1989 | Okamoto et al. | 55/523 |
| 4,869,207 | 9/1989 | Engstrom et al. | |
| 4,904,287 | 2/1990 | Lippert et al. | 55/302 |
| 4,960,448 | 10/1990 | Zievers et al. | 55/523 |
| 4,973,459 | 11/1990 | Lippert et al. | 55/523 |
| 5,078,760 | 1/1992 | Haldipur et al. | 55/523 |
| 5,082,480 | 1/1992 | Dorazio | 55/523 |
| 5,114,581 | 5/1992 | Goldsmith et al. | |
| 5,284,498 | 2/1994 | Davis et al. | 55/269 |

Primary Examiner—C. Scott Bushey
Attorney, Agent, or Firm—Nixon & Vanderhye

[57] ABSTRACT

Either atmospheric pressure or superatmospheric pressure high temperature gases, as from a gasifier or other circulating fluidized bed reactor, are filtered using monolithic ceramic filter elements mounted in an advantageous manner within a vessel. At least one generally upright hollow chamber element is mounted by a tube plate within the vessel, and has at least one gas impervious side wall having a column of openings in it, an open end, and a closed end. Monolithic ceramic filter elements are mounted in the openings. A number of chamber elements are typically provided, e.g. mounted in a circular pattern, and/or mounted to extend downwardly from a top tube plate and upwardly from a bottom tube plate. Backflushing of the filter elements dislodges separated particles, which fall down to the bottom of the vessel and are removed through a central discharge opening.

11 Claims, 5 Drawing Sheets

CERAMIC FILTERING OF GASES

CROSS-REFERENCE TO RELATED APPLICATION

This application is a continuation-in-part of application Ser. No. 08/089,814 filed Jul. 12, 1993, now U.S. Pat. No. 5,458,665 the disclosure of which is incorporated by reference herein.

BACKGROUND AND SUMMARY OF THE INVENTION

This invention relates to an apparatus for filtering high temperature gases, such as high pressure gases discharged from a circulating fluidized bed reactor. The filtration apparatus typically comprises porous ceramic filter elements. The present invention filters high temperature gases containing solid contaminants, efficiently removing accumulated solids from the filtering elements in a safe manner.

It is known in the prior art to use ceramic filters in order to remove particulates from hot gas streams. It is e.g. known to use candle type ceramic filters (as shown in U.S. Pat. No. 4,869,207) supported by a tube sheet for cleaning hot gases. The size of the filter housing is however presently limited, the practical limit for the diameter of a pressure vessel with candle type filters being about 3–5 m.

It has also been suggested to utilize monolithic ceramic filters, having e.g. a plurality of passageways extending longitudinally from inlet end to outlet end, but being plugged to prevent direct passage of the feed stock through the passageways from the inlet face to the outlet face. The cleaning capacity of clusters of such monolithic ceramic filters is much higher than of conventional candle type or tubular ceramic filters. The monolithic ceramic filters thereby being less space consuming than conventional tubular or candle type ceramic filters. The mounting of these elements in filtration vessels in high temperature surroundings with possible large temperature variations has however led to very complicated constructions.

It is also known that it is essential to have the filters cleaned, e.g. after certain pre-determined operating periods, in order to be able to maintain the desired pressure drop. Commonly used methods of cleaning the filter employ a reverse directional pulse of gas for flushing the filter. This kind of method is disclosed e.g. in U.S. Pat. No. 5,284,498 showing in a filtration vessel a single integral inner shell provided with ceramic monolithic filter elements for passing clean gas from the inner dirty gas side of the inner shell to the outer annular clean gas side of the shell. A backpulsing nozzle for backpulsing cleaning gas is provided in front of each monolithic filter element.

According to one embodiment of the present invention, an apparatus for filtering high temperature gases both from pressurized (i.e. superatmospheric pressure, typically over 2 bar) systems and atmospheric systems, is provided. The filtration apparatus comprises following elements: A generally upright vessel having a top, a bottom and a side wall. At least one generally horizontal filter supporting plate, e.g. a tube sheet like partition, adjacent the top or the bottom of the vessel, the supporting plate dividing the vessel to provide a dirty gas side and a clean gas side. A high temperature dirty gas inlet disposed in the side wall on the dirty gas side of the at least one filter supporting plate. At least one clean gas outlet disposed adjacent the top or the bottom of the vessel on the clean gas side of the at least one filter supporting plate. At least one generally upright hollow chamber element, having an interior volume and one closed end and one open end, disposed on the dirty gas side of the at least one supporting plate and connected at its open end to an opening in the supporting element, for connecting the interior volume of the hollow chamber element with the clean gas side of the supporting plate. The hollow chamber element having at least one generally impervious side wall preventing dirty gas from flowing from the dirty gas side into the interior of the chamber element; and a plurality of porous monolithic ceramic filter elements mounted in openings disposed in a side wall of the hollow chamber element, for allowing clean gas to flow from the dirty gas side into the interior volume of the hollow chamber element, and to the gas outlet.

The apparatus according to the present invention may advantageously utilize monolithic ceramic filter elements, such as CeraMem™ filters as shown in U.S. Pat. No. 5,114,581, or cross flow filters as shown in U.S. Pat. No. 5,078,760 (the disclosures of which are incorporated by reference herein). CeraMem™ filter elements are typically cylindrical having several parallel longitudinal passageways therethrough, the passageways being plugged to prevent dirty gas from flowing directly through the passageways and forcing clean gas to flow through the porous ceramic material into an adjacent passageway connected with the clean gas side. Cross flow ceramic filter elements are typically formed of several ceramic ribbed sheets forming crosswise clean and dirty gas channels.

According to a preferred embodiment of the present invention a filter supporting tube sheet is disposed in the upper part of an upright pressure vessel having a clean gas outlet at the top thereof, the tube sheet having supporting on the lower side thereof several parallel generally tubular candle like hollow chamber elements forming filter modules. The tubular elements have one open end and one closed end and are connected at their open end to openings in the tube sheet. The tubular elements further each having a row of monolithic ceramic filter elements mounted in openings disposed one on top of the other in a vertical side wall of the tubular elements. The monolithic filter elements are preferably all disposed on one and the same side of the tubular elements. The tubular elements may have a rather small diameter, as long as it is possible to insert the monolithic filter elements into openings made in the side walls of the tubular elements.

The porous ceramic filter elements, typically being cylindrical in form and having one inlet (dirty) end and one outlet (clean) end, preferably protrude with their outlet end relatively deep into the tubular elements, such that the ceramic element may cover >½, or even more, of the cross sectional inner area of the tubular elements. The tubular elements need enough free inner space for clean gas to be able to flow through the elements into the clean gas side of the tube sheet.

The cross section of the tubular elements, i.e. the filter modules, may be substantially D-shaped, i.e. having one straight side and one generally semi-circular side. The ceramic filter elements are thereby easily connected to openings on the straight side. It is, of course, possible also to use tubular elements having polygonal (e.g. square) or circular cross-sections, and it is possible to dispose monolithic filter elements on all sides of the tubular elements. The tubular elements may also have partition walls therein. The filter elements may i.e. be arranged in, zig zag form, in turn on opposite sides of the tubular element, the filters overlapping each other within the tubular element.

When utilizing relatively thin tubular elements or filter modules it is easy to mount the tubular elements to the tube sheet. The present new tubular hollow chamber elements, being made of e.g. of metal plate material, cooled or non-cooled, are easy to connect to a tube sheet in conventional manner. Temperature differences, e.g. when backpulsing or when starting or shutting down a process, do not cause problems.

Also other advantages are achieved especially when backpulsing the ceramic filters, when the filter elements are disposed with their clean ends protruding rather deep, e.g.>½ of them, into the tubular elements.

Backpulsing of monolithic ceramic filter elements in these narrow elongated tubular chamber elements can be done in a conventional manner e.g. as has been suggested for different candle type filters, by injecting clean gas (e.g. air) into the tubular chamber. The high pressure cleaning pulse thereby compresses the portions of the ceramic filter elements inside the tubular chamber from all sides, preventing mechanical breakage of the filter elements.

The tubular elements may be supported by their own constructions on the tube sheet. Alternatively several tubular elements may be supported by a common support structure connected to the tube sheet or the filtration vessel itself.

According to another embodiment of the present invention there may be only one or only a few hollow chamber elements, having a larger diameter than above mentioned tubular elements, within the filtration vessel. Such hollow chambers may have several vertical rows of ceramic filter elements disposed in openings on the side walls thereof. The filter elements may be disposed in groups, in vertical columns one on top of the other, in clusters vertically and horizontally aligned, or in circular rows around the whole periphery of the hollow chamber element, so that each group, i.e. vertical column, cluster or circular row, of ceramic elements may be connected to its own separate backpulsing system. Each separate backpulsing system may include a shielding forming a chamber-like element in front of each separate group of ceramic elements, the shieldings thereby also dividing the hollow chamber into separate clean gas zones. These zones are protected by the shielding when backpulsing other zones.

According to still another embodiment of the present invention there may be two or more tube sheets in the filtration vessels, two tube sheets e.g. dividing the inner space of a vessel into a middle dirty gas zone and a top and bottom clean gas zone. A dirty gas inlet is formed in the side wall of the vessel for leading dirty gas into the dirty gas zone. Clean gas outlets are formed between the tube sheets and the vessel top and bottom respectively. Several tubular elements with one single row of ceramic filter elements therein or larger hollow chamber elements with several rows of ceramic filter elements, may be disposed in the dirty gas zone between the tube sheets, connected at their open ends to either tube sheet. Tubular elements connected to the upper tube sheet, hanging downward from the sheet, and tubular elements connected to the lower tube sheet, protruding upwardly from the tube sheet, have a length preferably<the distance between the tube sheets, the tubular elements thereby not interfering with each other. It is of course possible, if desired, to utilize longer tubular elements protruding from one tube sheet almost to the other, when there is enough horizontal space between the tubular elements coming from one side for the tubular elements from the other side therebetween. Also various baffles and separated particle guide means are provided to ensure optimum operational efficiency.

Cleaning of dirty gas having particles entrained therein may be performed using a vessel having at least one filter supporting plate or tube sheet dividing the vessel interior into a dirty gas side and a clean gas side, one or several vertical hollow chamber elements such as tubular elements being connected at their open end to an opening in the supporting plate and having several porous monolithic ceramic filter elements disposed in the side walls thereof. The cleaning process comprising the steps of: (a) Introducing high temperature gas with entrained particles to be filtered into the dirty gas side in vessel through an inlet opening in a side wall thereof. (b) Leading clean gas from the dirty gas side through the porous monolithic ceramic filter elements into the interior of the one or several hollow chamber elements and further to the clean gas side of the supporting plate for being discharged through a gas outlet arranged therein. (c) At predetermined intervals, directing a pulse of cleaning gas into the interior of the one or several hollow chamber elements, for backpulsing said porous monolithic ceramic filter elements; and (d) discharging solid particles dislodged from the ceramic filter elements through an outlet in the bottom of the vessel.

Dirty gas, such as process gas from a combustor or gasifier, introduced into the vessel may be guided by guide plates/baffles disposed in the vessel for dividing the gas as evenly as possible to all ceramic filters in the vessel. The dirty gas may be cleaned in ceramic filter elements mounted in vertical columns in tubular chamber elements, one column in each element. The tubular chambers are connected to a tube sheet in the vessel. Backpulsing gas may be introduced into each tubular element separately periodically or intermittently.

DETAILED DESCRIPTION OF THE DRAWINGS

Figure 1:
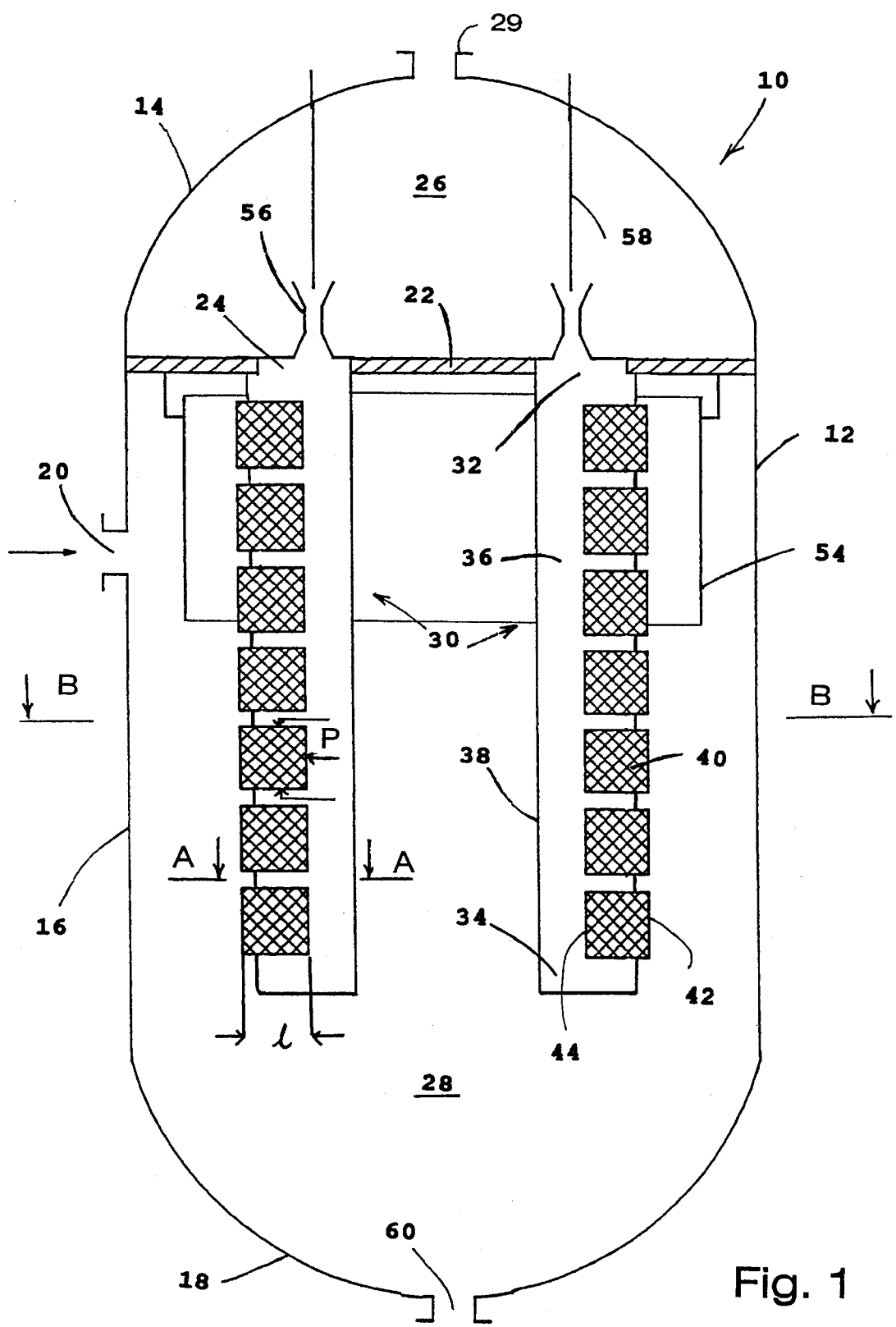
FIG. 1 is a schematic side cross-sectional view of an exemplary filtration apparatus according to the present invention.

An exemplary filter assembly for high temperature (i.e. over 400° C.) gases is shown generally by reference numeral 10 in FIG. 1. It includes a generally upright vessel 12 having a top 14, side wall 16 and bottom 18. In the side wall 16 is a gas inlet 20 for particle laden high temperature dirty gas. The inlet 20 can be connected to a fluidized bed combustor, gasifier, or the like source of particle laden high temperature (typically over 400° C.) gas.

A generally horizontal filter supporting plate or tube sheet shown generally by reference numeral 22, is provided in the upper part of the vessel 12, in this embodiment having several through extending openings 24. The tube sheet 22 divides tile interior of the vessel 12 into a dirty gas volume 28 below the tube sheet 22 and a clean gas volume 26 above the tube sheet 22. A clean gas outlet 29 is provided in the clean gas volume 26 in the top 14 of the vessel 12.

Each opening 24 in the tube sheet 22 is adapted to receive at its lower side in the dirty gas volume 28 of the vessel 12 a primarily tubular element 30, i.e. a hollow chamber element only two of which are seen in FIG. 1. The primarily tubular element 30 is generally vertical and has an open upper end 32 and a closed lower end 34. The tubular element 30 is connected at its open end 32 to an opening 24 in the tube sheet 22, the tubular element 30 thereby having its inner volume 36 connected to the clean gas volume 26 of the vessel 12. The side walls 38 of the tubular element 30 are typically made of steel plate, and form a generally gas tight enclosure.

In openings formed in a vertical column, one on top of the other, typically in a straight side wall 38 of each tubular element 30, porous monolithic ceramic filter elements 40 are mounted, for allowing gas to pass through the filter elements 40 from the dirty gas volume 28 into the interior 36 of the tubular elements 30. The gas being cleaned. The filter elements 40 are joined in a gas tight manner with the straight side wall 38 in which they are mounted. Particles separated from the dirty particle laden gas accumulate on the surface of tile filter elements 40.

Figure 2:
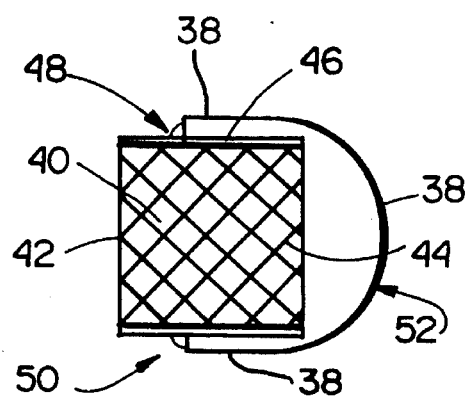
FIG. 2 is an enlarged schematic cross-sectional view taken along line AA of a filter module in FIG. 1.

The monolithic ceramic filter elements 40, which may be cylindrical in form and have an inlet end 42 and an outlet end 44, protrude more than half their length 1 into the tubular element 30. The ceramic filter elements 40 are protected by a metal sleeve 46, as can be seen in FIG. 2, showing an enlarged cross-sectional view of a tubular element 30 taken along line AA of FIG. 1. The metal sleeve 46 is also cylindrical and has generally the same diameter as the ceramic filter element 40. The sleeve 46 is e.g. shrunk around the ceramic filter element and welded in a gas-tight manner at points 48 to an opening in the side wall 38 of the tubular element 30 in which it is mounted. Heat transfer insulation and/or a seal (not shown) may be provided between the sleeve 46 and the ceramic filter element 40 if necessary.

Figure 3:
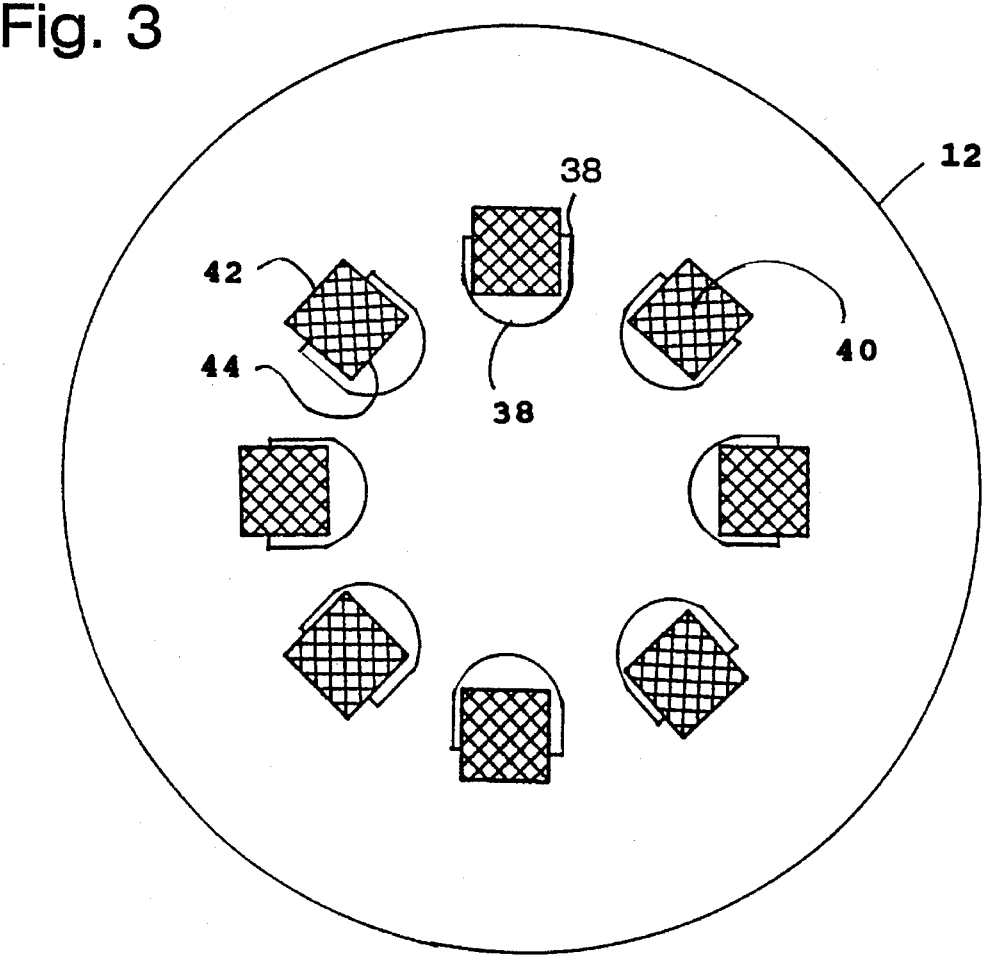
FIG. 3 is a schematic cross-sectional view taken along line BB of FIG. 1.

Each tubular element 30 may have a substantially D-shaped cross-section, as can be seen from FIGS. 2 and 3, FIG. 3 showing a cross-section of vessel 12 in FIG. 1 taken along line BB. The cross-section of the tubular element 30 includes one straight side 250 of the side walls 38, and one at least partly semi-circular side 52 of the side walls 38. The ceramic elements 40 are connected to the straight side 50 of the side wall of the tubular element. The cross-sectional partly straight and partly semi-circular form of the tubular element provides advantages in construction and backpulsing of the filter elements 40. The tubular elements 30 may be advantageously mounted within the vessel 12 in a circular pattern as shown in FIG. 3, with the open ends 42 of the filter elements 40 facing radially outwardly.

Tubular baffle 54 may be mounted in the dirty gas volume 28 of the vessel 12—as seen in FIG. 1—in order to guide the dirty gas evenly over all ceramic filter elements 40. The baffle 54 typically extends less than one half the height of the vessel 12, as seen in FIG. 1, although it can extend almost any distance.

Means for backpulsing the ceramic filter elements 40 are provided at the open ends 32 of the tubular elements 30 forming filter modules in the vessel. A venturi 56 may be disposed at each opening 24 in the tube sheet 22 and a clean gas injecting nozzle 58 is provided for backpulsing (backflushing) cleaning gas at periodic or intermittent intervals through each venturi 56 into the tubular elements or filter modules 30 for cleaning the filter elements 40. Since the filter elements 40 protrude deeply into the hollow chamber forming each tubular element 30, the filter elements 40 are prevented from breaking even at high pressure backpulsing, as backpulsing pressure will compress the portion of the filter element 40 within the tubular element 30 on all sides as shown by small arrows p in FIG. 1, and thereby e.g. prevent different ceramic layers from being separated from each other.

Backpulsing dislodges particulate material accumulated at the inlet side 42 of each filter element 40. The dislodged particulate material falls into the bottom 18 of the vessel 12 and is discharged through centrally located solid material (separated particles) outlet 60 substantially at the center of the bottom of vessel 12.

Figure 4:
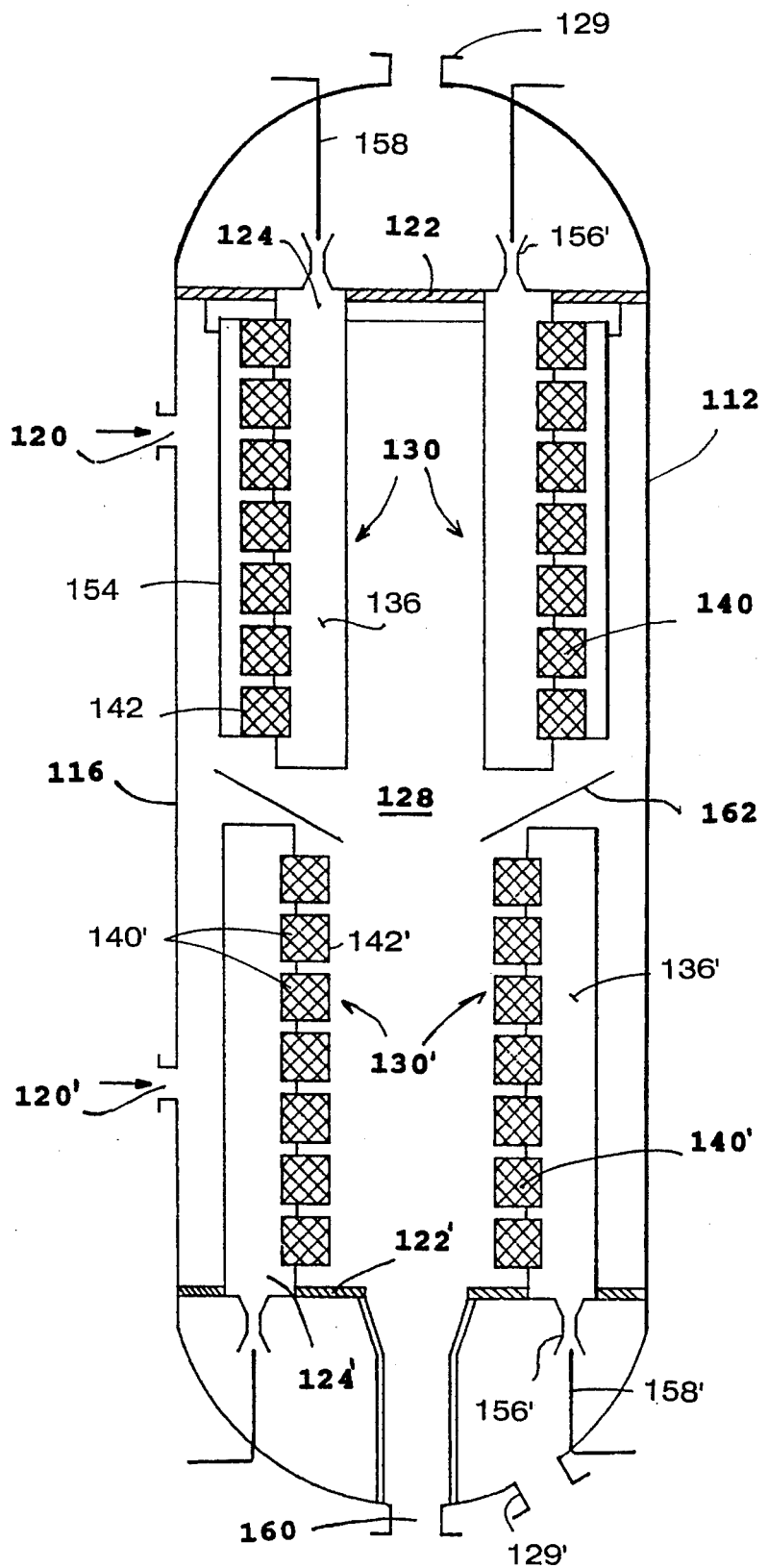
FIG. 4 is a view like that of FIG. 1 only showing another embodiment according to the present invention.

FIG. 4 shows another embodiment of the present invention. In FIG. 4 components comparable to those in the FIGS. 1 through 3 embodiment are shown by the same reference numeral only preceded by a "1". Tube sheets 122 and 122' are disposed at different ends of the vessel 112, forming a dirty gas volume 128 therebetween. Filter modules 130 and 130' are provided in circular configurations mounted in openings 124, 124' in the tube sheets 122, 122'. Filter modules 130 hang downwardly from the upper tube sheet 122 and filter modules 130' protrude upwardly from tube sheet 122'. Two dirty gas inlets 120 and 120' are provided in the side wall 116 of the vessel.

The upper filter modules 130 correspond to those shown in FIG. 1 and have the ceramic filter elements 140 mounted on the outer periphery side of the filter modules, i.e. so that inlet sides 142 thereof face radially outwardly. The lower filter modules 130' have ceramic filter elements 140' on the inner periphery side thereof, thereby facilitating discharge of solid particles through the central discharge opening 160 when backpulsing the lower filter modules 130'. That is open ends 142' of the filter elements 140' face radially inwardly. Because of this the tubular baffle 154 provided for the upper elements 130 is not necessary for the lower elements 130'.

The particles dislodged from the upper filter modules 130 are guided by guide means, such as plates 162, into the central parts of the vessel 112 so that they do not impact, or interfere with elements 140', and so that there is a straight path to discharge from opening 160. In this embodiment the filter elements 140 protrude only a small distance into the tubular elements 130. Especially when there is no immediate danger that backpulsing of filter elements 140 may cause damage to the filter elements 140, it may for other reasons be advantageous to have the filter elements 140 protrude out of the tubular elements (filter modules) 130.

Figure 5:
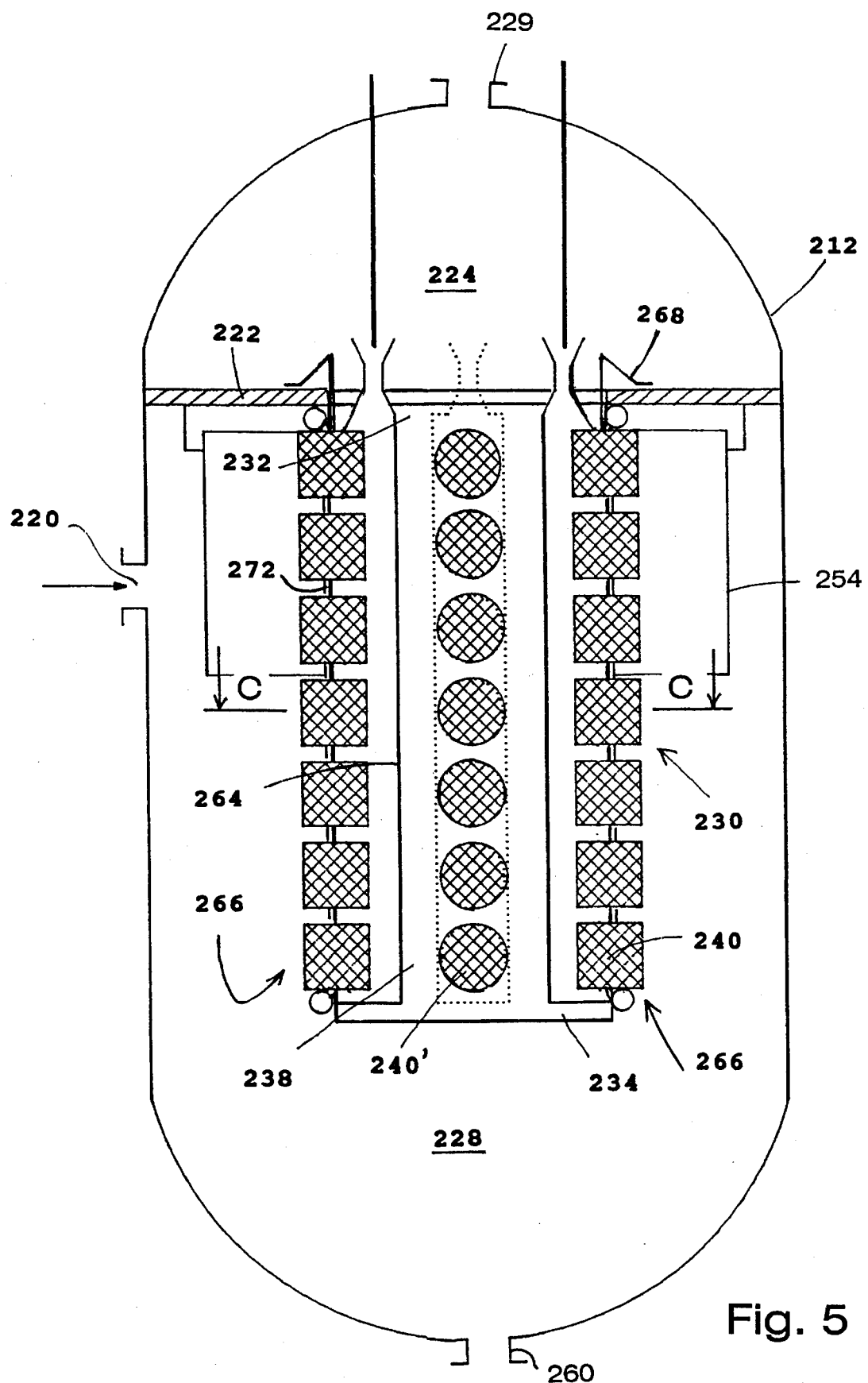
FIG. 5 is a view like that of FIG. 1 only showing another embodiment according to the present invention.

FIG. 5 shows still another exemplary embodiment of the present invention. In FIG. 5 components comparable to those in the FIGS. 1 through 3 and 4 embodiments are shown by the same reference numeral only preceded by a "2". In this embodiment, a vessel 212 has a filter support plate or tube sheet 222, a gas tight hollow chamber element 230 within the dirty gas volume 228 in the vessel 212, and filter elements 240 disposed in openings in a side wall 238 of each hollow chamber element 230.

According to this embodiment a coaxial central hollow chamber element 230 is provided in the vessel 212. The chamber element 230 shown in FIG. 5 is cylindrical, however the chamber element 230 may be polygonal or of any other suitable form. The chamber element 230 has one open upper end 232 and a closed lower end 234. The open upper end 232 is connected to the central opening 224 of the support plate 222.

The gas tight side wall 238 of the hollow chamber 230 is cooled, the wall may be made of membrane panels, such as omega panels or other water (or other cooling fluid) cooled panels. The filter support plate 222 may also be cooled (not shown in FIG. 5). The side wall 238 may be made of tube panels having extra broad fins between tubes in order to be able to insert filter elements in openings in the fins. It is also possible to bend tubes apart at locations where filter elements 240 are to be inserted into a side wall 238.

Cooling of the side walls 238 facilitates joining of ceramic filter elements 240 to the wall as temperature differences between side wall and ceramic filter are minimized. In high temperature surroundings both side wall and joint construction maybe made of less expensive material if cooled. And if it is necessary to cool the gas it can advantageously be cooled while simultaneously cleaning (filtering) the gas. The heat may be recovered, and can be used to produce steam or hot water.

In this embodiment a wider hollow chamber element 230 than the tubular elements 30 of FIG. 1 is utilized. According to this embodiment only one hollow chamber element 230 is used and several adjacent columns of filter elements 240 are disposed in the side wall 238, and not just one column as shown in the tubular elements 30 of FIG. 1. The filter elements 230 do not have to be mounted in vertical columns—i.e. other distribution patterns may be used.

Even if utilizing one single hollow chamber 230 for supporting the ceramic filter elements 240 it is advantageous to backpulse the filter elements in several different groups at intervals. Therefore as shown in FIG. 5 a shielding 264 is provided in front of each vertical row 266 of generally cylindrical filter elements 240. The shielding in front of the middle row of filter elements 240 is only shown with a dotted line (the filter elements 240' in the middle row being shown in a front view).

Filter elements 240, 240' in each column 266 of elements can be backpulsed separately. It is of course possible to group the filter elements differently if desired, e.g. to group all filter elements at the same horizontal level in a circular group or any other configuration found suitable. That is, in essence a number of smaller hollow chamber elements (264) are mounted within the main element 230.

The main hollow chamber element 230 is preferably flexible supported at the support plate 222 with elements 268 connected to the supporting side walls 238.

Figure 6:
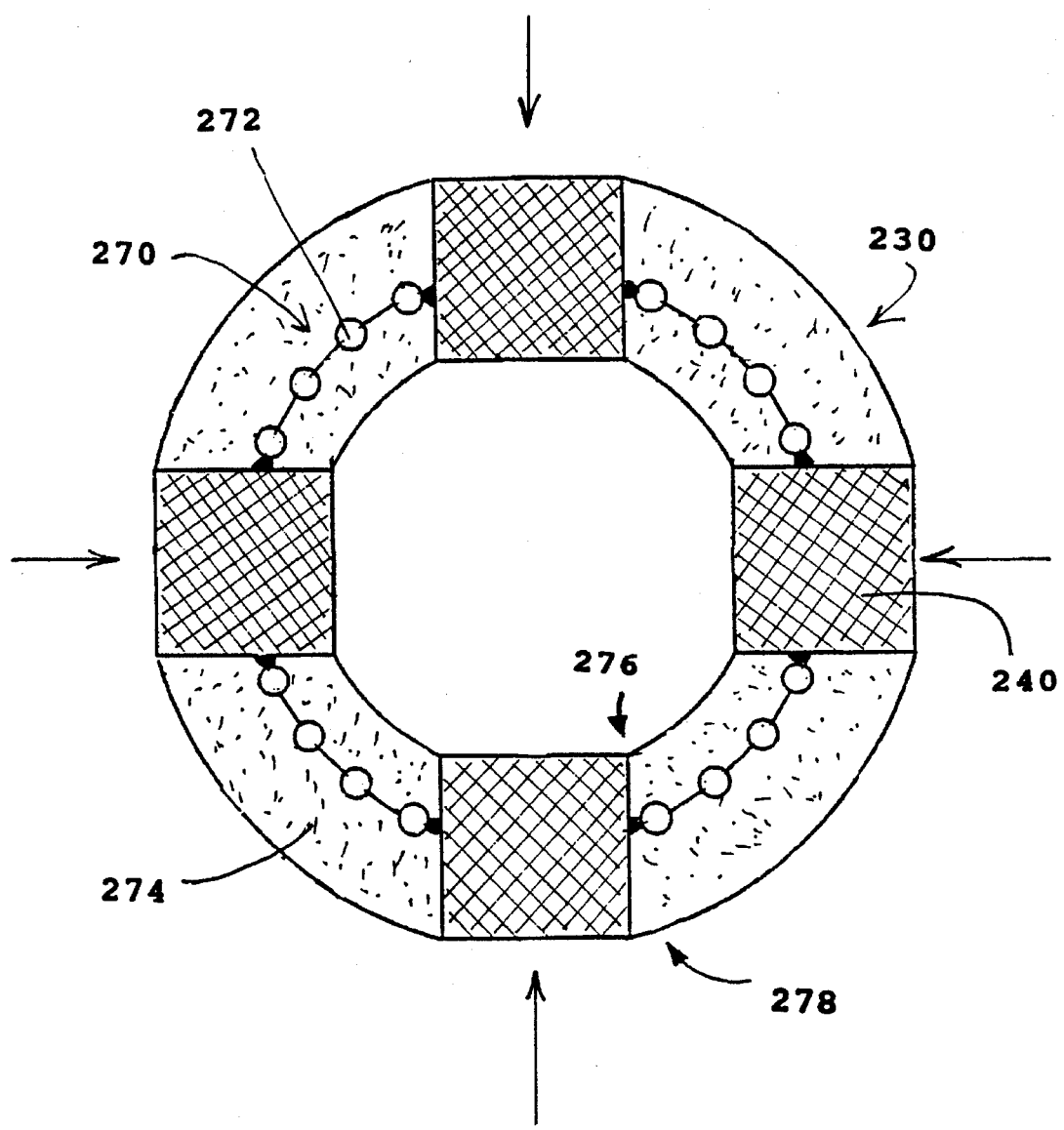
FIG. 6 is a schematic cross-sectional view taken along line CC of FIG. 5.

FIG. 6 shows a schematic cross-sectional view of the main hollow chamber element 230 of FIG. 5 taken along line CC. The ceramic filter elements 240 are inserted between water tube panels 270, comprising four vertical water tubes 272 between each ceramic filter element 240. The ceramic filter elements 240 are supported by the water tube panels 270 generally at their midpoints. The water tube panels 270 are insulated with refractory lining 274, thereby providing a smooth surface at both sides of the hollow chamber 230, without portions of the ceramic filter elements 240 protruding from the plane of the side walls 276, 278. The panels 270 may be connected to conventional heat recovery equipment.

While several exemplary embodiments of the invention are shown, it is to be understood that other modifications are also possible within the scope of the invention. For example the monolithic ceramic filter elements may have other forms than cylindrical described here. The filter elements maybe additionally coated or otherwise combined with catalytic material for catalytic processing of flue gases passing the filter elements, or provided with other coatings. Thus the invention is to be accorded the broadest interpretation of the appended claims so as to encompass all equivalent structures and devices.

What is claimed is:

1. Apparatus for filtering high temperature gases from either pressurized or atmospheric systems, comprising:

a generally upright vessel having a top, a bottom and a side wall;

at least one generally horizontal filter supporting plate adjacent the top or the bottom of the vessel, said at least one filter supporting plate dividing the vessel to provide a dirty gas side and a clean gas side;

a high temperature gas inlet disposed in the side wall on the dirty gas side of the at least one filter supporting plate;

at least one gas outlet disposed adjacent the top or the bottom of the vessel on the clean gas side of the at least one filter supporting plate;

at least one generally upright hollow chamber element, having an interior volume and one closed end and one open end, disposed on the dirty gas side of said at least one supporting plate and connected at its open end to an opening in said supporting plate, for connecting said interior volume of said hollow chamber element with the clean gas side of said supporting plate;

said hollow chamber element having at least one generally gas impervious side wall preventing dirty gas from flowing from the dirty gas side into said interior volume of said chamber element; and a plurality of monolithic ceramic filter elements mounted in openings provided in a side wall of said hollow chamber element, through which clean gas may flow from the dirty gas side into said interior volume of the hollow chamber element, and to said gas outlet, each filter element having a length; and wherein the monolithic ceramic filter elements are mounted in said at least one side wall of the hollow chamber element such that more than half of the length of the filter elements protrude into the interior of the hollow chamber element.

2. Apparatus for filtering high temperature gases from either pressurized or atmospheric systems, comprising:

a generally upright vessel having a top, a bottom and a side wall;

at least one generally horizontal filter supporting plate adjacent the top or the bottom of the vessel, said at least one filter supporting plate dividing the vessel to provide a dirty gas side and a clean gas side;

a high temperature gas inlet disposed in the side wall on the dirty gas side of the at least one filter supporting plate;

at least one gas outlet disposed adjacent the top or the bottom of the vessel on the clean gas side of the at least one filter supporting plate;

at least one generally upright hollow chamber element, having an interior volume and one closed end and one open end, disposed on the dirty gas side of said at least one supporting plate and connected at its open end to an opening in said supporting plate, for connecting said interior volume of said hollow chamber element with the clean gas side of said supporting plate;

said hollow chamber element having at least one generally gas impervious side wall preventing dirty gas from flowing from the dirty gas side into said interior volume of said chamber element; and a plurality of monolithic ceramic filter elements mounted in openings provided in a side wall of said hollow chamber element, through which clean gas may flow from the dirty gas side into said interior volume of the hollow chamber element, and to said gas outlet; each filter element having a length; and wherein the monolithic ceramic filter elements are mounted in said at least one side wall of the hollow chamber element such that less than half of the length of the filter elements protrude out of the side wall into the dirty gas side.

3. Apparatus for filtering high temperature gases from either pressurized or atmospheric systems, comprising:

a generally upright vessel having a top, a bottom and an exterior side wall defining a vessel interior;

at least one generally horizontal filter supporting plate adjacent the top or the bottom of the vessel, said at least one filter supporting plate dividing the vessel interior into chambers to provide a dirty gas side and a clean gas side;

a high temperature gas inlet disposed in the exterior side wall on the dirty gas side of the at least one filter supporting plate;

at least one gas outlet disposed adjacent the top or the bottom of the vessel on the clean gas side of the at least one filter supporting plate;

at least one generally upright hollow chamber element, having an interior volume and one closed end and one open end, disposed on the dirty gas side of said at least one supporting plate and connected at its open end to an opening in said supporting plate, for connecting said interior volume of said hollow chamber element with the clean gas side of said supporting plate;

said hollow chamber element having at least one generally gas impervious side wall preventing dirty gas from flowing from the dirty gas side into said interior volume of said chamber element; and a plurality of monolithic ceramic filter elements mounted in openings provided in a side wall of said hollow chamber element, through which clean gas may flow from the dirty gas side into said interior volume of the hollow chamber element, and to said gas outlet; and wherein said ceramic filter elements each has a length and comprises a porous ceramic body having a plurality of longitudinal passageways therethrough, the passageways being plugged to prevent dirty gas from flowing directly through the passageways and forcing clean gas to flow through the porous ceramic material into an adjacent passageway connected to the clean gas side; and wherein the monolithic ceramic filter elements are mounted in said at least one side wall of the hollow chamber element such that less than half of the length of the filter elements protrude out of the side wall into the dirty gas side.

4. Apparatus for filtering high temperature gases from either pressurized or atmospheric systems, comprising:

a generally upright vessel having a top, a bottom and an exterior side wall defining a vessel interior;

at least one generally horizontal filter supporting plate adjacent the top or the bottom of the vessel, said at least one filter supporting plate dividing the vessel interior into chambers to provide a dirty gas side and a clean gas side;

a high temperature gas inlet disposed in the exterior side wall on the dirty gas side of the at least one filter supporting plate;

at least one gas outlet disposed adjacent the top or the bottom of the vessel on the clean gas side of the at least one filter supporting plate;

at least one generally upright hollow chamber element, having an interior volume and one closed end and one open end, disposed on the dirty gas side of said at least one supporting plate and connected at its open end to an opening in said supporting plate, for connecting said interior volume of said hollow chamber element with the clean gas side of said supporting plate;

said hollow chamber element having at least one generally gas impervious side wall preventing dirty gas from flowing from the dirty gas side into said interior volume of said chamber element; and a plurality of monolithic ceramic filter elements mounted in openings provided in a side wall of said hollow chamber element, through which clean gas may flow from the dirty gas side into said interior volume of the hollow chamber element, and to said gas outlet; and wherein said ceramic filter elements each has a length and comprises a porous ceramic body having a plurality of longitudinal passageways therethrough, the passageways being plugged to prevent dirty gas from flowing directly through the passageways and forcing clean gas to flow through the porous ceramic material into an adjacent passageway connected to the clean gas side; and wherein the monolithic ceramic filter elements are mounted in said at least one side wall of the hollow chamber element such that more than half of the length of the filter elements protrude into the interior of the hollow chamber element.

5. Apparatus as recited in claim 4 wherein a filter supporting tube sheet is disposed in the upper part of a pressure vessel having a gas outlet at the top thereof, said tube sheet having several parallel vertical hollow chamber elements connected to the lower side of the tube sheet, and said hollow chamber elements each having one column of monolithic ceramic filter elements mounted in openings disposed one on top of the other in side walls thereof.

6. Apparatus as recited in claim 5 further comprising means for backpulsing said monolithic ceramic filter elements.

7. Apparatus as recited in claim 4, further comprising means for backpulsing said monolithic ceramic filter elements, said means including a nozzle for injecting cleaning gas into said hollow chamber element, for backpulsing the ceramic filter elements mounted in the side walls thereof.

8. Apparatus as recited in claim 4, further comprising a separated particles outlet in tile center of tile bottom of said vessel.

9. An apparatus as recited in claim 4, wherein several parallel vertical elongated hollow chamber elements are connected at their open ends to said filter support plate, said hollow chamber elements being generally D-shaped in cross-section so that said at least one side wall comprises a curved side wall portion and a first straight side wall portion opposite said curved side wall portion, each hollow chamber element having several monolithic ceramic filter elements mounted in openings disposed in a column, one on top of the other, in said first straight side wall portion thereof.

10. Apparatus as recited in claim 4 further comprising a tubular baffle disposed in said vessel disposed between said gas inlet and said at least one hollow chamber element.

11. Apparatus as recited in claim 4 wherein said porous ceramic body is cylindrical.

* * * * *